United States Patent [19]

Crivello

[11] 4,416,752
[45] Nov. 22, 1983

[54] METHOD OF COATING A CONDUCTING SUBSTRATE AND COATED SUBSTRATES OBTAINED THEREBY

[75] Inventor: James V. Crivello, Clifton Park, N.Y.

[73] Assignee: General Electric Company, Schenectady, N.Y.

[21] Appl. No.: 338,826

[22] Filed: Jan. 11, 1982

[51] Int. Cl.$^3$ ............................................. C25D 13/08
[52] U.S. Cl. ................................................ 204/181 R
[58] Field of Search ..................................... 204/181 R

[56] References Cited

U.S. PATENT DOCUMENTS 3,483,109  12/1969  Brane et al. ...................... 204/181 R
3,501,432   3/1970  Wright et al. .................... 204/181 R
4,144,159   3/1979  Bosso et al. ...................... 204/181 C

OTHER PUBLICATIONS

Effects of Pulses of Current on the Cationic Electropolymerization of Isobutylvinylether, Funt et al., Journal of Polymer Science, Part A-1, vol. 9, pp. 115-127 (1971).

Die elektrochemisch initiierte kationische Polymerisation von Acrolein, $\beta$-Propiolacton, 3.3-Bis-(chlormethyl)-oxetan und Trioxan, Strobel et al., Die Makromolekulare Chemie 133 (1970) 303-306 (Nr. 3347).

Electro-Initiated Cationic Polymerizations-V, Cerral et al., American Polymer Journal, vol. 15, pp. 153-159, Pergamon Press, Ltd. (1979), Great Britain.

Primary Examiner—Howard S. Williams
Attorney, Agent, or Firm—William A. Teoli; James C. Davis, Jr.; James Magee, Jr.

[57] ABSTRACT

A method is provided for electroinitiating cationic polymerization on the surface of a metal substrate or a metallized nonconducting substrate. The conducting substrate is used as the anode in an electrolyzed bath of a cationically polymerizable organic material, and an effective amount of an arylonium salt, such as diphenyliodonium hexafluorophosphate. An organic solvent also can be used.

13 Claims, No Drawings

METHOD OF COATING A CONDUCTING SUBSTRATE AND COATED SUBSTRATES OBTAINED THEREBY

BACKGROUND OF THE INVENTION

Prior to the present invention, procedures for electrocoating metallic substrates with polymeric organic materials was well established as shown by Basso et al., U.S. Pat. No. 4,038,232, involving electrodeposition of solubilized electrodepositable compositions, for example, epoxy containing organic resins, or Jones, U.S. Pat. No. 4,040,924, relating to the cationic electrodeposition of epoxy resins onto a metallic substrate.

Efforts were made to effect the polymerization of various cationically polymerizable organic materials through electroinitiation to eliminate the requirements of preparing electrodepositable organic polymers, for example, W. Strobel and R. C. Schultz, Die Macromol. Chem., 133, 303 (1970), attempted unsuccessfully to polymerize epoxy monomers employing a 3% $LiClO_3$ in nitromethane as the electrolyte. Additional studies of electroinitiation of cationic polymerization were performed by B. L. Funt et al., J. Polym. Sci., Pt. A-1, 9, 115 (1971) and P. Cerrai et al., Eur. Polym. J., 15, 153 (1979).

The present invention is based on the discovery that an arylonium salt, as defined hereinafter, can be used to electroinitiate the cationic polymerization of a cationically polymerizable monomer, for example, 4-vinylcyclohexenedioxide. As a result, the coating of a conducting substrate used as the anode can be achieved with a cationically polymerizable organic monomer as the principal component in the electrolyzed bath. Accordingly, electrocoating baths having specially formulated electrodepositable polymers used in the prior art are no longer necessary.

STATEMENT OF THE INVENTION

There is provided by the present invention a method of coating a conducting substrate which comprises using the conducting substrate as the anode in an electrolyzed mixture comprising a cationically polymerizable material and an effective amount of aryliodonium salt or arylsulfonium salt having an $MQ_d$ anion, where M is a metal or metalloid selected from boron, phosphorus, antimony and arsenic, Q is a halogen radical and d is an integer having a value of 4-6.

The arylonium salts which can be used in combination with cationically polymerizable organic monomer to form the coating bath, are selected from aryliodonium salts having the formula, $$[(R)_a(R^1)_bI]^+ MQ_d^- \qquad (1)$$

and arylsulfonium salts having the formula, $$[(R)_c(R^2)_d(R^3)_eS]^+ MQ_d^- \qquad (2)$$

where M, Q and d are as previously defined, R is a monovalent aromatic organic radical, $R^1$ is a divalent aromatic organic radical, $R^2$ is a monovalent organic aliphatic radical selected from alkyl, cycloalkyl and substituted alkyl, $R^3$ is a polyvalent organic radical forming a heterocyclic or fused ring structure selected from aliphatic radicals and aromatic radicals, a is a whole number equal to 0 or 2, b is a whole number equal to 0 or 1, and the sum of a +b is equal to 1 or 2, c is a whole number equal to 0 to 3 inclusive, d is a whole number equal to 0 to 2 inclusive, e is a whole number equal to 0 or 1, and the sum of c+d+e has a value equal to 2 or 3.

Radicals included by R can be the same or different aromatic carbocyclic or heterocyclic radical having from 6 to 20 carbon atoms, which can be substituted with from 1 to 4 monovalent radicals selected from $C_{(1-8)}$alkoxy, $C_{(1-8)}$ alkyl, nitro, chloro, etc. R is more particularly phenyl, chlorophenyl, nitrophenyl, methoxyphenyl, pyridyl, etc. Radicals included by $R^1$ are divalent radicals such as

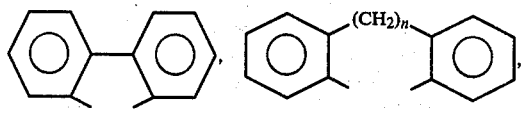

$R^2$ radicals include $C_{(1-8)}$ alkyl such as methyl, ethyl, etc., substituted alkyl such as $-C_2H_4OCH_3$, $-CH_2COOC_2H_5$, $-CH_2COCH_3$, etc. $R^3$ radicals include such structures as

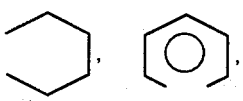

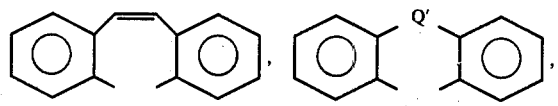

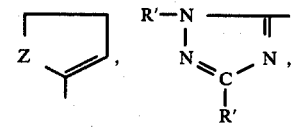

where Q' is selected from O, $CH_2$, N, R and S; Z is selected from $-O-$, $-S-$ and

and R' is a monovalent radical selected from hydrogen and hydrocarbon.

Halonium salts included by formula 1 are, for example,

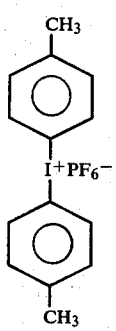

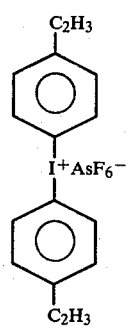

-continued

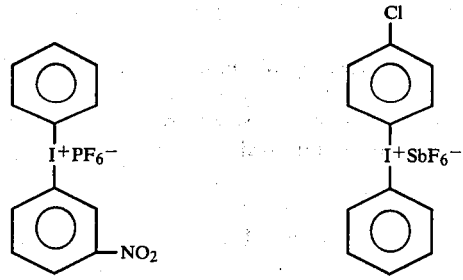

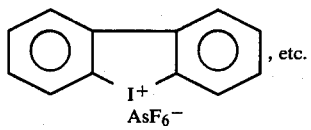

Group VIa onium salts included by formula 1 are, for example,

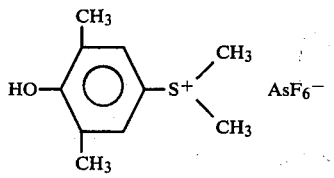

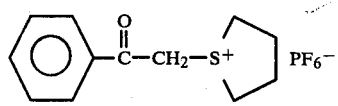

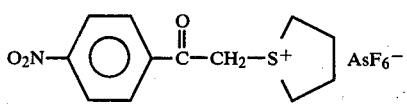

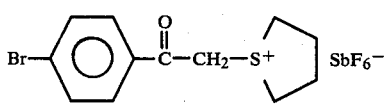

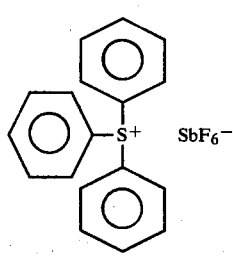

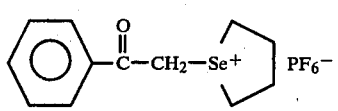

-continued

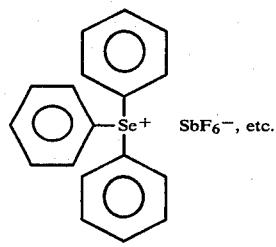

The cationically polymerizable organic materials which can be used in the practice of the present invention include epoxy resins, for example, any monomeric, dimeric, or oligomeric or polymeric epoxy material containing one or a plurality of epoxy functional groups. For example those resins which result from the reaction of bisphenol-A (4,4'-isopropylidenediphenol) and epichlorohydrin, or by the reaction of low molecular weight phenolformaldehyde resin (Novolak resin) with epichlorohydrin can be used alone or in combination with an epoxy containing compound a a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxysiloxane resins, epoxy-polyurethanes and epoxy-polyesters. Such polymers usually have epoxy functional groups at the ends of their chains. Epoxy-siloxane resins and method for making are more particularly shown by E.P. Plueddemann and G. Fanger, J. Am. Chem. Soc. 80 632-5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,840; 3,567,797; 3,677,955; etc. Further coreactants which can be used with epoxy resins are hydroxy terminated flexibilizers such as hydroxy terminated polyesters, shown in the Encyclopedia of Polymer Science and Technology, Vol. 6, 1967, Interscience Publishers, New York, pp. 209-271 and particularly p. 238.

Some of the vinyl organic prepolymers which can be used to make the polymerizable compositions of the present invention are, for example, $CH_2=CH-O-(CH_2-CH_2O)_{n'}CH=CH_2$, where $n'$ is a positive integer having a value up to about 1000 or higher; multifunctional vinylethers, such as 1,2,3-propane trivinylether, trimethylolpropane trivinylether, prepolymers having the formula,

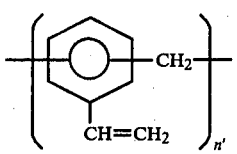

low molecular weight polybutadiene having a viscosity of from 200 to 10,000 centipoises at 25° C., etc.

A further category of the organic materials which can be used to make the polymerizable compositions are cyclic ethers which are convertible to thermoplastics. Included by such cyclic ethers are, for example, oxetanes such as 3,3-bis-chloromethyloxethane, alkoxyoxetanes as shown by Schroeter, U.S. Pat. No. 3,673,216, assigned to the same assignee as the present invention; oxolanes such as tetrahydrofuran, oxepanes, oxygen containing spiro compounds, trioxane, dioxolane etc.

In addition to cyclic ethers there are also included cyclic esters such as β-lactones, for example propiolactone, cyclic amines, such as 1,3,3-trimethylazetidine and organosilicon cyclics, for example, materials included by the formula,

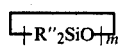

where R″ can be the same or different monovalent organic radical such as methyl or phenyl and m is an integer equal to 3 to 8 inclusive. An example of an organosilicon cyclic is hexamethyl trisiloxane, octamethyl tetrasiloxane, etc. The products made in accordance with the present invention are high molecular weight oils and gums.

There are also included among the cationically polymerizable organic materials polyvinyl compounds having the formula, $$R^6[GR^7OC(R^8)\!=\!C(R^9)_2]_p \tag{3}$$

where $R^6$ is a polyvalent aromatic organic radical, $R^7$ is a $C_{(1-8)}$ alkylene radical, $R^8$ and $R^9$ are the same or different monovalent radicals selected from hydrogen, halogen and $C_{(1-8)}$ alkyl radicals, G is O or C is O and p is an integer equal to 2–10 inclusive.

Some of the aromatic polyvinylethers included by the above formula are,

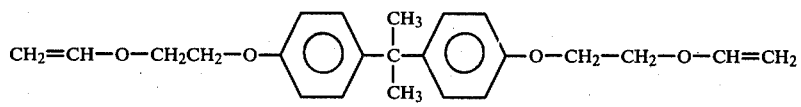

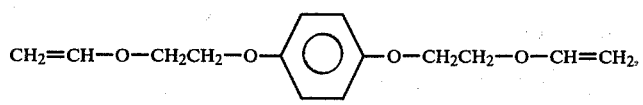

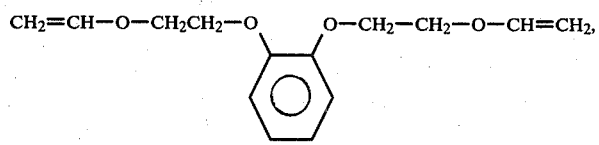

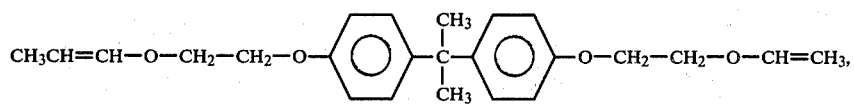

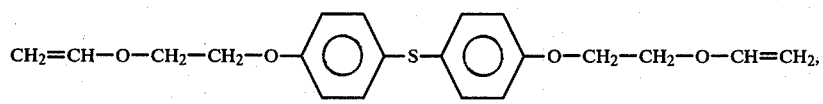

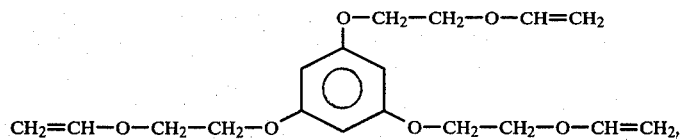

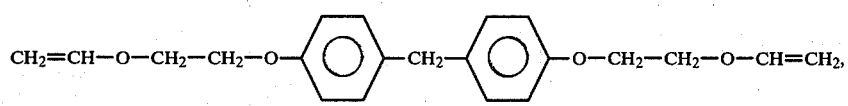

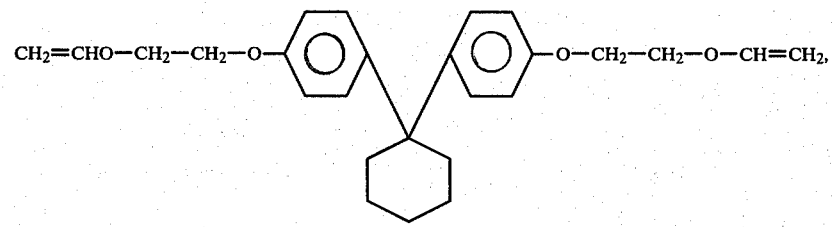

-continued

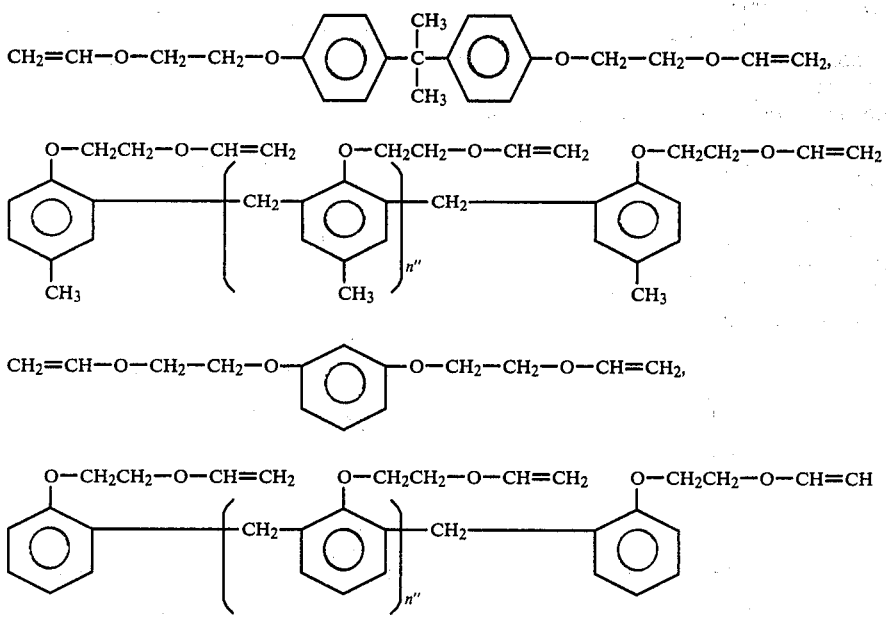

where n″ is an integer equal to 1-10 inclusive.

In the practice of the present invention, a mixture of cationically polymerizable organic material, referred to hereinafter as "organic resin" which can include a mixture of cationically polymerizable organic monomer and cationically curable organic polymer is mixed with an effective amount of the arylonium salt. An effective amount of the onium salt can vary from about 0.1% to 10% based on the weight of the organic resin in the bath. The bath also may require an organic solvent in instances where the organic resin is a solid or to facilitate the dissolution of the arylonium salt. Suitable organic solvents are for example, ethylene chloride, tetrahydrofuran, dioxane, nitromethane, methylene chloride, tetrachloroethanol, nitrobenzene, nitroethane, methyl ethyl ketone, methylisobutyl ketone.

Effective results can be achieved if a solids concentration of from 10% to 100% of organic resin based on the weight of the bath is used. Electroinitiation can be effected by simply passing a current through the bath utilizing the object to be coated as the anode and a metallic electrode as the cathode. Temperatures in the range of between 0° C. to 100° C. can be used and the bath is preferably agitated during the coating procedure. Voltages of from 5V to 250V and a current of from 10 ma to 10A will provide coated metallic substrates within 0.5 seconds or less to 5 minutes or more. Depending upon such factors as the duration the anode is in the bath, the voltage of the power source, the concentration of the aryl onium salt, etc., the coating thickness of the electroinitiated organic resin can vary between about 0.1 mils to 20 mils.

Among the objects which can be used as anodes in the practice of the present invention to effect the electroinitiation of the cationic polymerization of the organic resin onto the surface thereof, are for example, automotive bodies and frames, motor and generator coils, stators and frames, wire conductors, capacitor coils, etc.

In order that those skilled in the art will be better able to practice the invention, the following examples are given by way of illustration and not by way of limitation. All parts are by weight.

EXAMPLE 1

Two steel electrodes approximately 6″×⅜″ were attached to a Hewlett Packard 6209B DC power supply were placed in a cell containing 15 parts of methylene chloride, 5 parts of 4-vinylcyclohexene dioxide and 1 part of diphenyliodonium hexafluoroarsenate which had been stirred until a mixture was homogeneous. There was applied to the bath, a voltage of 160 volts which provided a current of 15 mA. A coating was formed at the anode in about 2 seconds and the coating was washed with methanol and it was found to be approximately 1 mil in thickness. The coated electrode was allowed to air dry for 15 minutes under atmospheric conditions. The coated electrode was found to resist removal as a result of vigorous wiping with a cloth soaked with acetone.

Similar results were achieved utilizing dioxane as the organic solvent in the polymerizable mixture in place of methylene chloride.

EXAMPLE 2

The procedure of Example 1 was repeated, except that in place of diphenyliodonium hexafluoroarsenate there was utilized an equivalent weight of several triphenylsulfonium photoinitiators. The following results were obtained:

| Catalyst | Result |
|---|---|
| $(C_6H_5)_3S^+ClO_4^-$ | no coating |
| $(C_6H_5)_3S^+BF_4^-$ | coating |
| $(C_6H_5)_3S^+SbF_6^-$ | thick coating |

The above results show that effective results are achieved if aryl onium salts are used having $MQ_d$ anions, where M is preferably P, Sb or As. A coating having a thickness of 1 mil was obtained with $SbF_6$, while $BF_4$ provided a coating of only about 0.2 mils.

EXAMPLE 3

The procedure of Example 1 was repeated, except that electrolyzable mixtures were prepared consisting of 5 parts of 4-vinylcyclohexene dioxide and 15 parts of methyl ethyl ketone. Aluminum electrodes were utilized in the respective electrolyzable mixtures consisting of the aforementioned ingredients and incremental amounts of diphenyliodonium hexafluoroarsenate. Each bath was stirred until homogeneous. Electroinitiation was conducted at 20 mA and 24 volts for 10 seconds. An increment of the diphenyliodonium electroinitation catalyst was added to each of the respective mixtures. The mixtures were electrolyzed and the electrodes were drained and dried at 100° C. for approximately 5 minutes. The thickness of the coatings on the anode electrodes were measured to determine whether a variation in initiator concentration affected coating thickness. The following results were obtained:

| Initiator Amount | Coating Thickness |
|---|---|
| 0.2 g | 0.7 mils |
| 0.4 g | 1.1 mils |
| 0.5 g | 1.1 mils |
| 0.6 g | 1.1 mils |

The above results show that at a given voltage, coating thickness can be influenced by initiator concentration.

EXAMPLE 4

The procedure of Example 1 was repeated, except that in place of the 4-vinylcyclohexene dioxide there was used a bisvinylether having the formula,

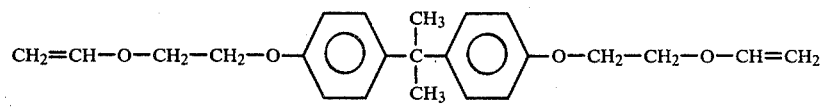

A continuous coating was obtained at 8 volts and 12 mA after 1 second of electroinitiation. A continuous coating also was obtained when the steel anode was replaced by a 5"×1" aluminum strip.

EXAMPLE 5

Additional electroinitiation baths were prepared to evaluate various initiators, solvents, polymerizable monomers and voltages to determine the type of films obtained as a result of varying the aforementioned parameters. The following results were obtained:

| Initiator | Solvent | Polymerizable Monomer | Voltage/Current (Time) | Results |
|---|---|---|---|---|
| 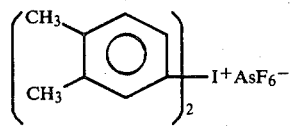 | methylene chloride | 4-vinylcyclohexene dioxide | 24V/20mA (10 sec.) | 1 mil colorless coating on aluminum |
| 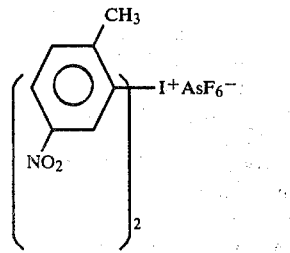 | methylene chloride | 4-vinylcyclohexene dioxide | 24V/20mA (10 sec.) | 1 mil colorless coating on aluminum |
| $(C_6H_5)_2I^+AsF_6^-$ | methyl ethyl ketone | 4-vinylcyclohexene dioxide | 24V/20mA (10 sec.) | transparent coating |
| $(C_6H_5)_2I^+AsF_6^-$ | methyl ethyl ketone | 4-vinylcyclohexene dioxide | 160V (10 sec.) | golden colored coating |
| $(C_6H_5)_2I^+AsF_6^-$ | nitromethane | 4-vinylcyclohexene dioxide | 24V/20mA (10 sec.) | clear colorless coating |
| $(C_6H_5)_2I^+AsF_6^-$ | nitromethane | 4-vinylcyclohexene dioxide | ~240V (10 sec.) | deep yellow-orange |
| $(C_6H_5)_2I^+AsF_6^-$ | $CH_2Cl_2$ | diglycidylether of bisphenol-A | 8V/18mA (20 sec.) | 2.8 mil coating on aluminum resisted 50% NaOH solution after being heated for 100° C./3 mm |
| $(C_6H_5)_2I^+AsF_6^-$ | $CH_2Cl_2$ | diglycidylether of bisphenol-A | 8V/18mA (20 sec.) | copper clad circuit board used as anode |
| $(C_6H_5)_2I^+SbF_6^-$ | $CH_2Cl_2$ | 3,4-epoxycyclo- | 24V/12mA | hard tack-free |

| Initiator | Solvent | Polymerizable Monomer | Voltage/Current (Time) | Results |
|---|---|---|---|---|
| | | hexylmethyl-3',4'-epoxy-cyclohexane carboxylate | (30 sec.) | coating on aluminum |
| $(C_6H_5)_2I^+PF_6^-$ | $CH_2Cl_2$ | 3,4-epoxycyclo-hexylmethyl-3',4'-epoxy-cyclohexane carboxylate | 24V/12mA (30 sec.) | tacky coating on aluminum |
| $(C_6H_5)_2I^+AsF_6^-$ | $CH_2Cl_2$ | diethyleneglycol divinylether | 24V/12mA (10 sec.) | hard 0.5 mil coating on aluminum |
| $(C_6H_5)_2I^+AsF_6^-$ | tetrahydrofuran | diethyleneglycol divinylether | 24V/12mA (10-20 sec.) | 0.8 mil and 1.0 mil coating on aluminum |
| $(C_6H_5)_2I^+AsF_6^-$ | $CH_2Cl_2$ | beta-pinene | 24V/20mA | a white polymer precipitate was obtained in methanol |
| 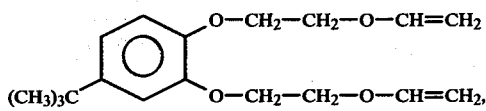 | methyl ethyl ketone | 4-vinylcyclohexene dioxide | 24V/20mA (10 sec.) | hard cured coating on aluminum |
| 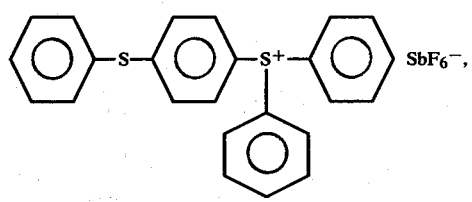 | methyl ethyl ketone | 4-vinylcyclohexene dioxide | 24V/20mA (10 sec.) | hard cured coating on aluminum |

The above results show that the aryliodonium and arylsulfonium salts of the present invention can be used to effect cationic polymerization of a variety of cationically polymerizable organic monomers on the surfaces of various conducting substrates through an electroinitiation mechanism to produce organic coatings on such surfaces.

EXAMPLE 6

A solution of 6.5 grams of a divinylether of the formula, (CH₃)₃C-C₆H₃(O-CH₂-CH₂-O-CH=CH₂)₂, in 15 ml methyl ethyl ketone and 0.5 grams of a sulfonium salt of the formula, (C₆H₅)-S-(C₆H₄)-S⁺(C₆H₅)₂ SbF₆⁻, was electrolyzed at 24 volts and 20 mA for 5 seconds on an aluminum anode. There was obtained a clear anodic coating which was further polymerized by briefly heating at 100° C. for 5 minutes. It was found that when the voltage was raised to 160≧240V a pale orange coating was obtained.

Although the above examples are directed to only a few of the very many variables involved in the practice of the method of the present invention it should be understood that the method of the present includes a much much broader variety of aryliondonium and arylsulfonium salts, cationically polymerizable monomers, solvents and conducting substrates as shown in the description preceding these examples.

What I claim as new and desire to secure by Letters Patent of the United States is:

1. A method of coating a conducting substrate which comprises using the conducting substrate as the anode in an electrolyzed mixture comprising a cationically polymerizable organic material and 0.1 to 10% by weight, based on the weight of the cationically polymerizable organic material of aryliodonium salt or arylsulfonium salt having an $MQ_d$ anion, where M is a metal or metalloid selected from boron, phosphorus, antimony and arsenic, Q is a halogen radical and d is an integer having a value of 4-6.

2. A method in accordance with claim 1, where the electrolyzed mixture contains an organic solvent.

3. A method in accordance with claim 1, where the aryl onium salt is a diphenyliodonium salt.

4. A method in accordance with claim 1, where the arylonium salt is a triarylsulfonium salt.

5. A method in accordance with claim 1, where the conducting substrate is a steel substrate.

6. A method in accordance with claim 1, where the conducting substrate is an aluminum substrate.

7. A method in accordance with claim 1, where the cationically polymerizable organic material is a vinyl ether monomer.

8. A method in accordance with claim 1, where the cationically polymerizable organic material is an epoxy monomer.

9. A method in accordance with claim 1, where the arylonium salt is a dialkylphenacyl sulfonium salt.

10. A method in accordance with claim 1, where the arylonium salt is a dialkyl hydroxyphenyl sulfonium salt.

11. A method in accordance with claim 1, where the cationically polymerizable organic material is a multi-functional epoxy resin mixture.

12. A method in accordance with claim 1, where the cationically polymerizable material is an epoxy novalac resin.

13. A coated substrate made in accordance with claim 1.

* * * * *